(12) United States Patent
Wilken

(10) Patent No.: US 6,282,873 B1
(45) Date of Patent: *Sep. 4, 2001

(54) BELT TENSION MECHANISM

(75) Inventor: Douglas J. Wilken, Brunswick, OH (US)

(73) Assignee: MTD Products Inc, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/467,188

(22) Filed: Dec. 20, 1999

Related U.S. Application Data

(62) Division of application No. 09/106,422, filed on Jun. 29, 1998, now Pat. No. 6,120,401.
(60) Provisional application No. 60/054,142, filed on Jul. 29, 1997.

(51) Int. Cl.[7] .................................. A01D 69/08
(52) U.S. Cl. .................. 56/11.3; 56/11.6; 474/109; 474/88; 474/117; 474/134; 474/135
(58) Field of Search .................. 56/11.6, 11.3, 56/11.4, 11.5, 11.7, DIG. 4, 14.7; 474/101, 109, 148, 139, 169, 185, 186, 84, 86, 88

(56) References Cited

U.S. PATENT DOCUMENTS

| | | | |
|---|---|---|---|
| 4,046,022 | * 9/1977 | Henderson . | |
| 4,187,924 | 2/1980 | Deschamps | 180/53 R |
| 4,231,215 | * 11/1980 | Klas . | |
| 4,265,133 | 5/1981 | Van Der Meulen et al. | 74/194 |
| 4,285,419 | 8/1981 | Anderson | 192/11 |
| 4,325,210 | 4/1982 | Marto | 56/11.6 |
| 4,328,659 | 5/1982 | Seyerle | 56/11.8 |
| 4,582,504 | 4/1986 | Schlapman et al. | 474/119 |
| 4,743,220 | 5/1988 | Berrios | 474/7 |
| 4,798,564 | * 1/1989 | Benedict . | |
| 4,892,507 | 1/1990 | Patin et al. | 474/50 |
| 5,012,632 | * 5/1991 | Kuhn et al. . | |
| 5,146,735 | 9/1992 | McDonner | 56/11.3 |
| 5,177,942 | 1/1993 | Hager et al. | 56/11.6 |
| 5,246,403 | 9/1993 | Uphaus | 474/83 |
| 5,361,566 | 11/1994 | Hohnl | 56/11.6 |

FOREIGN PATENT DOCUMENTS 63-125849 * 5/1988 (JP) .

* cited by examiner

*Primary Examiner*—H. Shackelford
(74) *Attorney, Agent, or Firm*—Roger D. Emerson; Emerson & Skeriotis; Timothy D. Bennett

(57) ABSTRACT

A belt tension mechanism for tensioning an associated belt drive system on an associated vehicle is provided. The associated belt drive system includes a double stacked pulley, a first belt for providing power from a power mechanism to the double stacked pulley and a second belt for providing power from the double stacked pulley to an associated implement. A first tensioning mechanism is provided for tensioning the first belt and a second tensioning mechanism is provided for tensioning the second belt. A tension arm selectively simultaneously tensions the first and second belts from an inoperative condition to an operative condition or from an operative condition to an inoperative condition. A balancing mechanism is also provided for balancing tension on the first and second belts as the implement is selectively height adjusted.

12 Claims, 4 Drawing Sheets

BELT TENSION MECHANISM

This application is a divisional application of Ser. No. 09/106,422, filed Jun. 29, 1998, now U.S. Pat. No. 6,120,401 and also claims benefit of Provisional No. 60/054,142 filed Jul. 29, 1997.

BACKGROUND OF THE INVENTION

1. Field of Invention

This invention pertains to belt drive systems and, more specifically, to a belt tensioning mechanism used on a two belt drive system for a riding lawn mower.

2. Description of the Related Art

It is known in the art of lawn mowers to use a two belt drive system. Typically, a first belt provides power from a PTO (power take-off) pulley to a first pulley on a double stacked pulley. As is commonly known in the art, the PTO pulley is driven by the engine of the riding lawn mower. A second belt is used for providing power from the second pulley of the double stacked pulley to the spindle pulleys of the mower deck. The spindle pulleys are used to rotate cutting blades as is commonly known in the art.

Often when a two belt drive system is used the engine is positioned toward the front of the mower, the mower deck is positioned toward the middle of the mower and, the double stacked pulley is positioned toward the back of the mower. This is done so that as the double stacked pulley is moved in one direction, the two belts are simultaneously tensioned. Similarly, movement of the double stacked pulley in the opposite direction simultaneously de-tensions the two belts. De-tensioning of the belts places the belt system into an inoperative condition which is required when, for example, it is necessary to remove one of the belts and/or install a new one.

It is many times desirable however, to position the mower deck toward the front of the lawn mower and position the engine toward the rear of the mower. This necessitates positioning the double stacked pulley between the mower deck and the engine of the mower. This creates difficulties with the two belt drive system because as the double stacked pulley is moved one belt tends to be tightened while the other is simultaneously loosened. Therefore, it is difficult to place the belt system into an in operative condition.

What is needed for such a two belt drive system, is a mechanism and method for tensioning the first and second belts from an operative condition to a inoperative condition using a single tension arm.

Another problem known in the art of riding lawn mowers is related to the fact that typically as the mower deck is adjusted for height (thereby adjusting the distance between the cutting blades and the lawn being cut) the mower deck is also moved along the length of the mower frame. Such a mower deck height adjustment tends to negatively affect the belts of a two belt drive system.

In U.S. Pat. No. 5,361,566, Hohnl attempts to minimize the misalignment of the belts that typically occurs when the mower deck is height adjusted. What is still needed, however, is a mechanism and a method for balancing the tension on the two belts of a two belt system as the mower deck is height adjusted.

The present invention provides methods and apparatuses for balancing the belt tensions of a two belt drive system as the mower deck is height adjusted. The present invention also provides methods and apparatuses for simultaneously tensioning the first and second belts from an inoperative condition to an operative condition. The difficulties inherent in the art, are therefore overcome in a way which is simple and efficient, while providing better and more advantageous results.

SUMMARY OF THE INVENTION

According to one aspect of the invention, a belt tension mechanism is provided for tensioning an associated belt drive system on an associated vehicle having a power means. The associated belt drive system includes a double stacked pulley, a first belt for providing power from the power means to the double stacked pulley and a second belt for providing power from the double stacked pulley to an associated implement. The belt tension mechanism includes a first tensioning means for tensioning the first belt, second tensioning means for tensioning the second belt, and, a tension arm. The tension arm can be used to selectively simultaneously tension the first and second belts from an inoperative condition to an operative condition. Likewise, the tension arm can be used to selectively simultaneously de-tension the first and second belts from an operative condition to an inoperative condition.

According to another aspect of the invention there is provided a method for tensioning an associated belt drive system on an associated vehicle having a power means. The associated belt drive system includes a double stacked pulley, a first belt for providing power from the power means to the double stacked pulley and a second belt for providing power from the double stacked pulley to an associated implement. The method comprises the steps of moving a tension arm, pivoting a double pulley arm in a first direction, pivoting an idler pulley arm in a second direction and, tensioning the first and second belts from an inoperative condition to an operative condition.

According to another aspect of the invention there is provided a belt tension balancing mechanism for use with an associated belt drive system on an associated vehicle having a power means. The associated belt drive system includes a double stacked pulley, a first belt for providing power from the power means to the double stacked pulley and a second belt for providing power from the double stacked pulley to an associated implement. The belt tension balancing mechanism includes first tensioning means for tensioning the first belt, second tensioning means for tensioning the second belt and, balancing means for balancing the tension on the first and second belts as the associated implement is position adjusted with respect to the associated vehicle.

According to still another aspect of the invention there is provided a method of balancing belt tensions in an associated belt drive system using a belt tension balancing mechanism. The associated belt drive system is for use on an associated vehicle having a power means, and includes a double stacked pulley, a first belt for providing power from the power means to the double stacked pulley and a second belt for providing power from the double stacked pulley to an associated implement. The belt tension balancing mechanism includes a double pulley arm having first and second ends and a midsection pivotably connected to the associated implement. The first end of the double pulley arm is pivotably connected to the double stacked pulley. The method comprises the steps of moving the associated implement, increasing a biasing force on the second end of the double pulley arm and, balancing torque about the midsection of the double pulley arm.

One advantage of the present invention is that both belts of a two belt drive system can simultaneously be tensioned from an inoperative condition to an operative condition or be de-tensioned from an operative condition to an inoperative condition. This is accomplished using a single tension arm.

Another advantage of the present invention is that belt tensions of a two belt drive system can be balanced as the mower deck is height adjusted. This reduces belt wear.

Still other benefits and advantageous of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
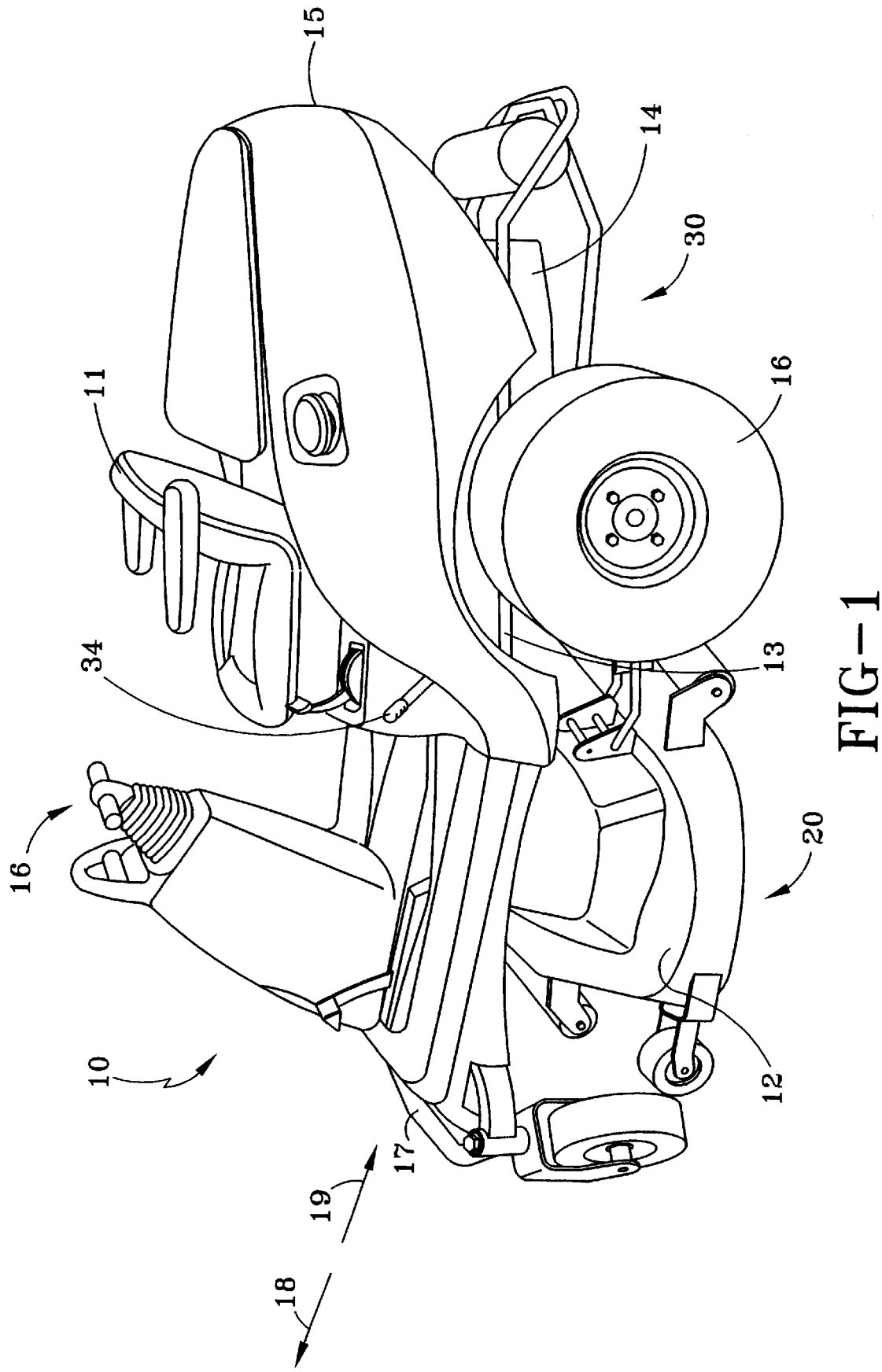
FIG. 1 shows a riding lawn mower using the belt tension mechanism of this invention.

Referring now to the drawings wherein the showings are for purposes of illustrating a preferred embodiment of the invention only and not for purposes of limiting the same, FIG. 1 shows a riding mower 10 which is equipped with the present invention, a belt tension mechanism 30. This preferred embodiment is directed to a riding lawn mower but the invention is applicable to walk-behind mowers, off-the-road vehicles, and other applications as well. The riding mower 10 includes an operator seat 11, a mower deck 12 that includes cutting blades 20, driving control means 16, a frame 13 and an engine 14. Although the preferred embodiment is directed to use with a mower deck 12, other implements could also be used with this invention.

Figure 2:
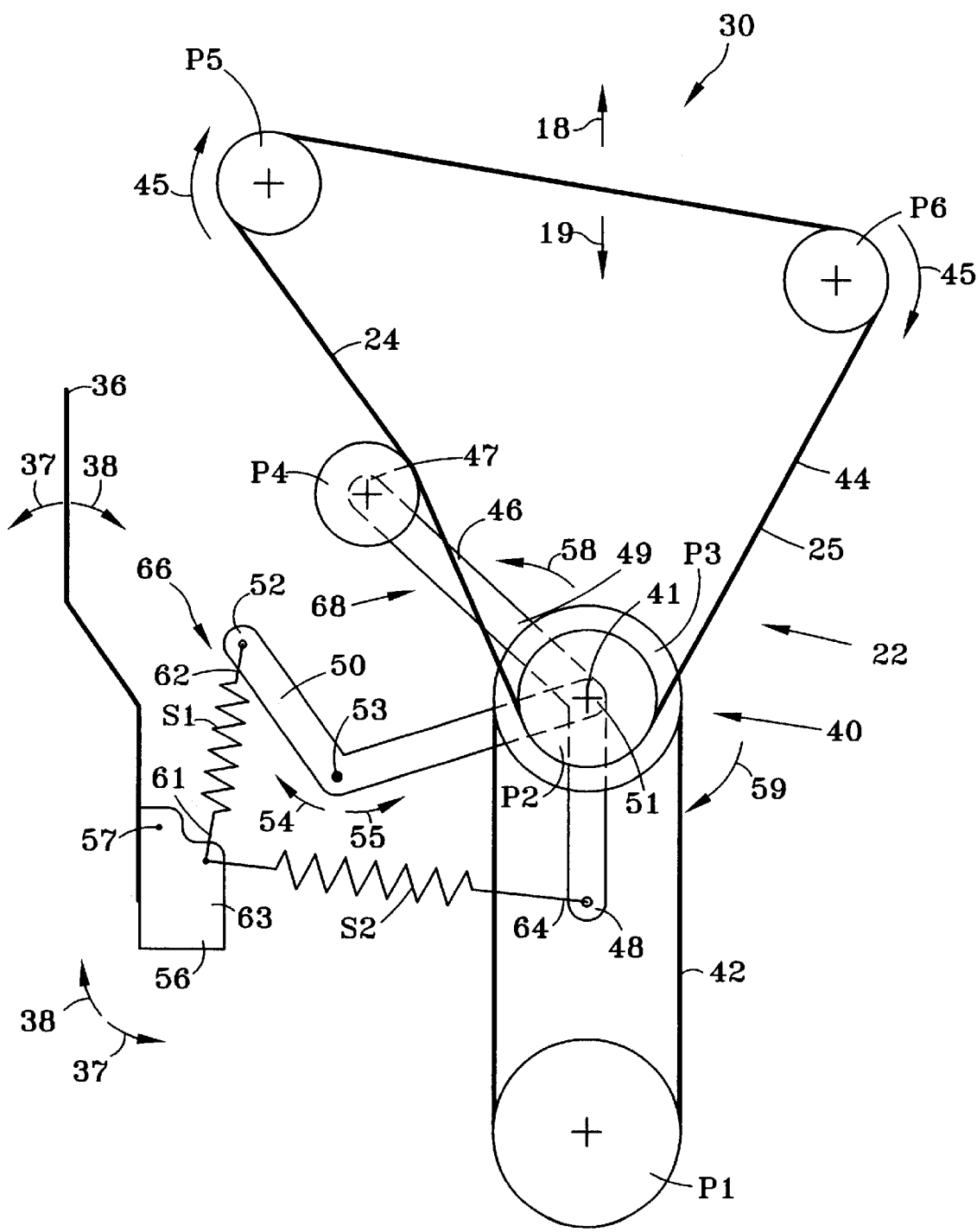
FIG. 2 is a schematic drawing of the two belt drive system illustrating first and second tensioning means for tensioning the two belts.

Referring to FIGS. 1–2, the engine 14 can be of any type currently used in the art and is used to rotate a shaft (not shown) which is fixedly attached to a PTO pulley P1(shown in FIG. 2). The cutting blades 20 are used for cutting lawns or other vegetation (not shown) as is commonly known in the art. A height adjustment lever 34 is used to adjust the height of the mower deck 12 thereby adjusting the distance between the cutting blades 20 and the lawn (not shown). A tension arm 36 (shown schematically in FIG. 2) is used to place the belt tension mechanism 30 into operative condition as will be discussed further below. The tension arm 36 is rigidly connected to a pivot bracket 56 that is pivotably connected at pivot point 57 to the frame 13 of the riding mower 10.

With reference now to FIGS. 1–2, a belt drive system 22 is used to transmit power from the PTO pulley P1 to first and second spindle pulleys P5, P6. The first and second spindle pulleys P5, P6 are located within the mower deck 12 and are used to rotate the cutting blades 20 as is commonly known in the art. Any number of spindle pulleys within a mower deck can be used with this invention. Of course one or more spindle pulleys could be used for purposes other than rotating a blade. The belt drive system 22 includes a double stacked pulley 40, a first belt 42 and a second belt 44. The double stacked pulley 40 includes a first pulley P3 and a second pulley P2 stacked concentrically and selectively rotatable around a pulley bolt 41 as is known in the art. The first belt 42 is operatively connected to the PTO pulley P1 and the first pulley P3 of the double stacked pulley 40. Thus, the PTO pulley P1 can transmit power via first belt 42 to the double stacked pulley 40. The second belt 44 operatively connects the second pulley P2 of the double stacked pulley 40 to the first and second spindle pulleys P5, P6. Thus, power can be transmitted from the double stacked pulley 40 to the first and second spindle pulleys P5, P6 thereby rotating the cutting blades 20. In the preferred embodiment, the engine 14 is positioned toward the back 15 of the riding mower 10, the mower deck 12 is positioned toward the front 17 of the riding mower 10 and the double stacked pulley 40 is positioned between the engine 14 and the mower deck 12 (see FIG. 1). The double stacked pulley 40 is therefore also preferably positioned between the PTO pulley P1 and the first and second spindle pulleys P5, P6 as shown in FIG. 2.

With continuing reference to FIGS. 1–2, the belt tension mechanism 30 of this invention includes first tensioning means 66 for tensioning the first belt 42, second tensioning means 68 for tensioning the second belt 44 and the tension arm 36. The second tensioning means 68 comprises an idler pulley P4, an idler pulley arm 46 and a second spring S2. The idler pulley arm 46 has first and second ends 47, 48 and a midsection 49. The midsection 49 of the idler pulley arm 46 is pivotably connected to the pulley bolt 41 at the bottom of the double stacked pulley 40. The idler pulley P4 is rotatably connected to the first end 47 of the idler pulley arm 46. The second spring S2 has first and second ends 63, 64. The second end 64 of the second spring S2 is pivotably connected to the second end 48 of the idler pulley arm 46. The first end 63 of the second spring S2 is pivotably connected to a pivot bracket 56. The second spring S2 biases the idler pulley arm 46 to pivot in a clockwise direction 59 (as viewed in FIG. 2) about the midsection 49. Thus, the second spring S2 biases the idler pulley P4 against the second belt 44, maintaining tension on the second belt 44. (It should be noted that all the remaining references to clockwise and counterclockwise directions are to be interpreted as visualized in FIG. 2 unless otherwise indicated.)

Referring now to FIG. 2, as is known in the art, a driven belt has a tension side and a slack side. The tension side is the portion of the driven belt that is "upstream" of the drive pulley and the slack side is the portion of the driven belt that is "downstream" of the drive pulley. Preferably, the second belt 44 is driven in clockwise direction 45 by the double stacked pulley 40. Thus, the tension side of the second belt 44 is indicated by reference number 25 and the slack side of the second belt 44 is indicated by reference number 24. Preferably then, the idler pulley P4 is in operative association with the slack side 24 of the second belt 44 to provide better belt life and to minimize the spring force requirements of the second spring S2.

Referring now to FIGS. 1–2, the first tensioning means 66 for tensioning the first belt 42 comprises a double pulley arm 50 and a first spring S1. The double pulley arm 50 has first and second ends 51, 52 and a midsection 53. The midsection 53 of the double pulley arm 50 is pivotably connected to the mower deck 12. The first end 51 of the double pulley arm 50 is pivotably connected to the pulley bolt 41 at the bottom of the double stacked pulley 40. The first spring S1 has first and second ends 61, 62. The second end 62 of the first spring S1 is pivotably connected to the second end 52 of the double pulley arm 50. The first end 61 of the first spring S1 is pivotably connected to the pivot bracket 56. The first spring S1 biases the double pulley arm 50 to pivot in a counter-clockwise direction 55 about the midsection 53. Thus, the first spring S1 biases the double stacked pulley 40 against the first belt 42, maintaining tension on the first belt 42.

Figure 3:
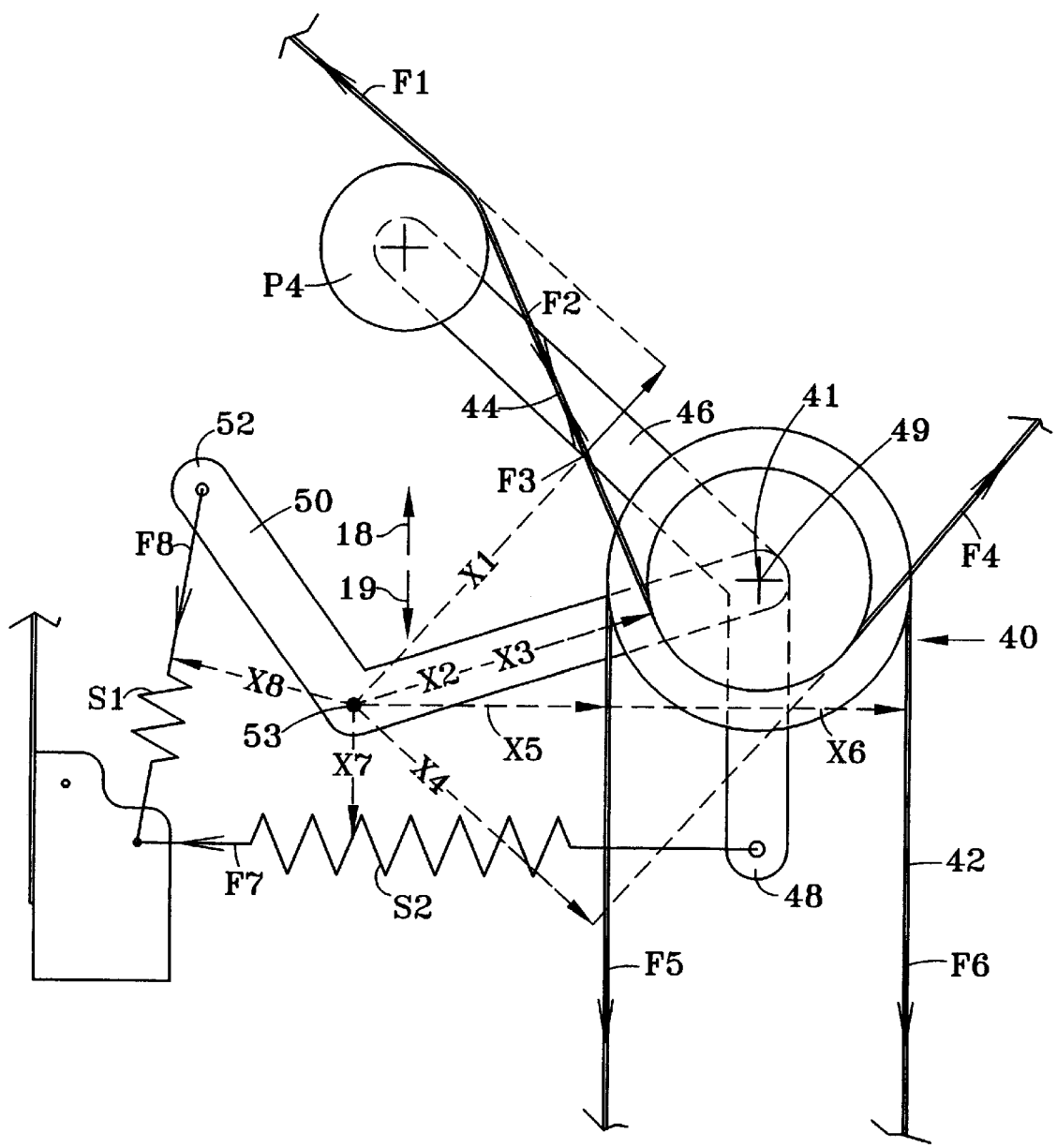
FIG. 3 is an enlarged view of a portion of FIG. 2 illustrating the various forces acting about the midsection of the double pulley arm.
Figure 4:
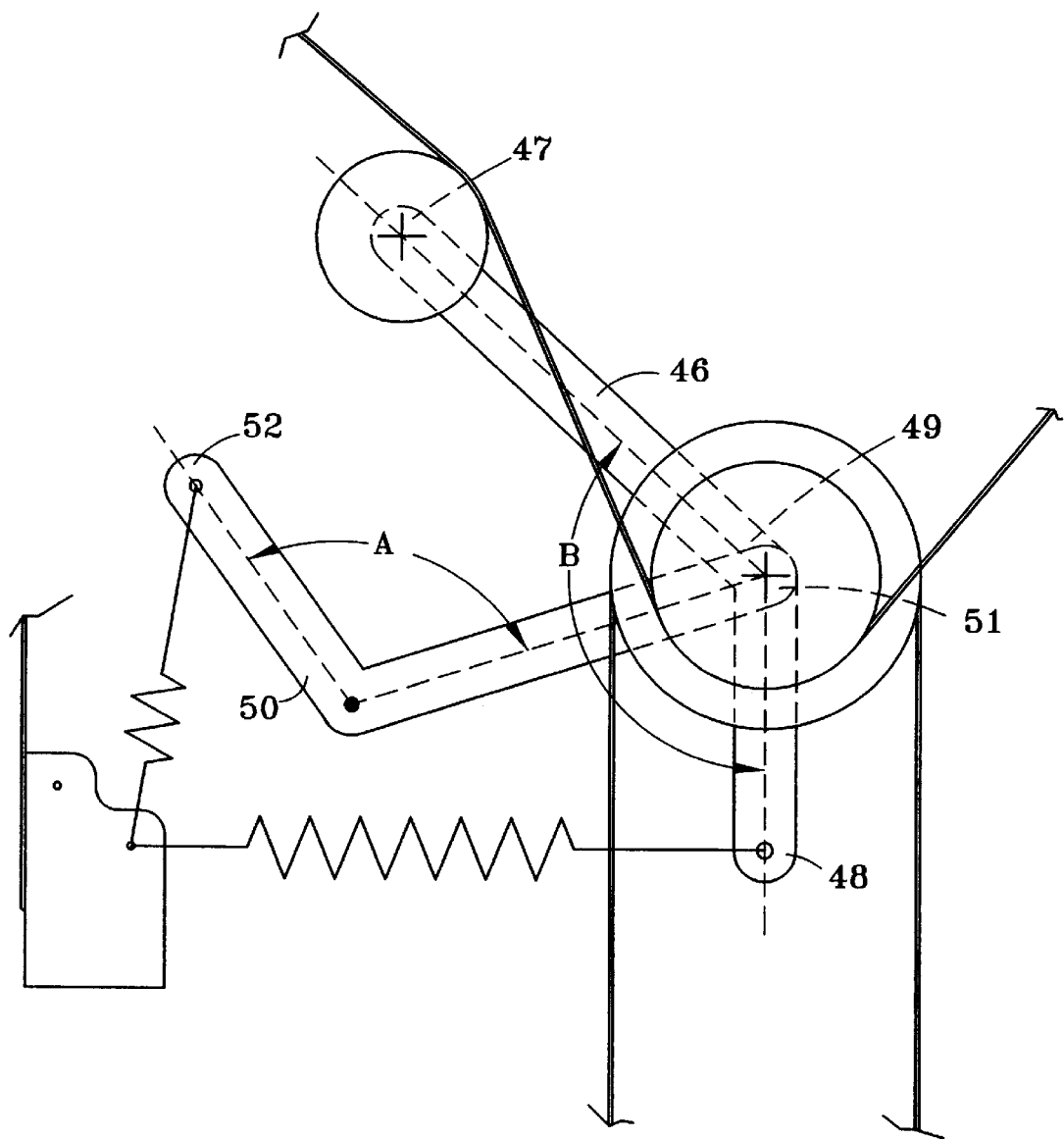
FIG. 4 is an enlarged view of a portion of FIG. 2 illustrating that the idler pulley arm and the double pulley arm are V-shaped.

With reference now to FIGS. 2–4, it should be noted that the idler pulley arm 46 and the double pulley arm 50 are preferably V-shaped. The idler pulley arm 46 is V-shaped at an angle B and the double pulley arm 50 is V-shaped at an angle A. The angles A, B should be between 0° and 180°. Preferably, the angles A, B are within the range of 90° to 170° thereby minimizing the required lengths of the arms 46, 50 and the springs S1, S2.

With reference to FIGS. 1–2, the first and second belts 42, 44 are shown in FIG. 2 in an operative condition. By operative condition it is meant that the first and second belts 42, 44 are operatively connected to the various pulleys (P1, P2, P3, P4, P5, P6) mentioned above. This is the normal condition when the belt tension mechanism 30 is being used. It is sometimes necessary, however, to place the belt tension mechanism 30 into an inoperative condition. By an inoperative condition it is meant that all tension has been taken off the first and second belts 42, 44 such that they could be removed and/or new belts could be installed. To place the belt tension mechanism 30 into an inoperative condition the tension arm 36 is moved in counterclockwise direction 37 thereby causing the pivot bracket 56 to also move in counterclockwise direction 37, pivoting about the pivot point 57. This motion relieves the tension in the first and second springs S1, S2 permitting the double pulley arm 50 to pivot about midsection 53 in clockwise direction 54 and idler pulley arm 46 to pivot about midsection 49 in counterclockwise direction 58. In this way the tension on both first and second belts 42, 44 is removed rendering the belt tension mechanism 30 inoperative and suitable for belt replacement.

With continuing reference to FIGS. 1–2, when the belt tension mechanism 30 is in an inoperative condition it is very easy to convert it into an operative condition. This is done by moving the tension arm 36 in clockwise direction 38 thereby causing the pivot bracket 56 to likewise pivot about pivot point 57 in clockwise direction 38. This motion supplies tension to the first and second springs S1, S2 thereby causing the double pulley arm 50 to pivot about the midsection 53 in counterclockwise direction 55 forcing the double stacked pulley 40 in forward direction 18 tensioning the first belt 42. The motion of the tension arm 36 also causes the idler pulley arm 46 to pivot about the midsection 49 in clockwise direction 59 forcing the idler pulley P4 into contact with the second belt 44 thereby tensioning the second belt 44. Thus, the tension arm 36 can be used to selectively and simultaneously tension both the first and second belts 42, 44 bringing them into operative condition and the tension arm 36 can also be used to selectively and simultaneously de-tension both the first and second belts 42, 44 bringing them into an inoperative condition.

With reference now to FIGS. 1–3, what is especially beneficial to the belt tension mechanism 30 of this invention is that the amount of tension applied to the first and second belts 42, 44 remains substantially constant when the mower deck 12 is height adjusted. This will be discussed further below. For now it should be noted that adjusting the height of the mower deck 12 causes the mower deck 12 to move longitudinally along the length of the riding lawn mower 10. In particular, lowering the mower deck 12 causes the mower deck 12 to move in forward direction 18 with respect to the frame 13 of the riding mower 10. Similarly, raising the mower deck 12 causes the mower deck 12 to move in backward direction 19 with respect to the frame 13 of the riding mower 10. In order to fully appreciate how the tension is balanced in the first and second belts 42, 44 it is necessary to consider a torque analysis about the midsection 53 of the double pulley arm 50. As is commonly known, the torque about a point equals the forces impacting that point times the right angle distances between the forces and that point. FIG. 3 illustrates the eight forces acting upon the midsection 53 of the double pulley arm as well as the right angle distances between those forces and the midsection 53.

With continuing reference to FIGS. 1–3, it should be noted that the forces about the midsection 53 are caused by the first belt 42, the second belt 44, the first spring S1 and the second spring S2. In particular forces F1, F2 are the forces impacting onto the idler pulley P4 due to the second belt 44. Forces F3, F4 are the forces impacting the double stacked pulley 40 due to the second belt 44. Forces F5, F6 are the forces imparted onto the double stacked pulley 40 due to the first belt 42. Force F7 is the spring force impacting the second end 48 of the idler pulley arm 46 due to the second spring S2. Similarly, force F8 is the spring force impacting the second end 52 of the double pulley arm 50 due to the first spring S1. The right angle distances between the forces and the midsection 53 are shown using reference letter X with a number corresponding to the force. Thus, for example, the distance X1 is the right angle distance between force F1 and the midsection 53. Similarly, the distance X8 is the right angle distance between force F8 and the midsection 53. The other distances X2, X3, X4, X5, X6, X7 are similarly related to the forces F2, F3, F4, F5, F6, F7 respectively.

Still referring to FIGS. 1–3, the equation for the torque about the midsection 53 will now be developed. It should be noted that counterclockwise forces, as shown in FIG. 3, are being considered as positive contributions to the torque, whereas forces in the clockwise direction are being considered negative contributions to the torque. The contributions to the torque could have been calculated in the opposite direction with this invention. It should also be noted that the expression $T_{53}$ represents the torque about the midsection 53. The summation of the torques about the midsection 53 are as follows:

$$T_{53} = F_1(X_1) - F_2(X_2) + F_3(X_3) + F_4(X_4) - F_5(X_5) - F_6(X_6) - F_7(X_7) + F_8(X_8)$$

To simplify this equation, substitutions can be made as will now be discussed. As noted above, the second belt 44 (and thus the double stacked pulley 40) is driven in clockwise direction 45. This further implies, of course, that the first belt 42 is also driven, by the PTO pulley P1, in a clockwise direction. Thus, the forces $F_1$, $F_2$, and $F_3$ correspond to the slack side tension of the second belt 44 and the force $F_4$ corresponds to the tension side tension of the second belt 44. Similarly, the forces $F_5$ and $F_6$ correspond to the slack and tension side tensions, respectively, for the first belt 42. Those skilled in the art realize that the slack and tension side tension forces in a belt are related by a tension ratio as $$F_T = F_S * R$$

where R represents the tension ratio, $F_T$ represents the force in the tension side of the belt and $F_S$ represents the force in the slack side of the belt. For the calculations that follow, the tension side force in the second belt 44 will be referenced as $F_{T44}$, the slack side tension in the second belt 44 will be referenced as $F_{S44}$ and the tension ratio for the second belt 44 about the double stacked pulley 40 will be referenced as $R_{44}$. Thus, $$F_{T44}=F_4$$

$$F_{S44}=F_1=F_2=F_3$$

and, $$F_{T44}=F_{S44}*R_{44}$$

Similarly, the tension side force, the slack side force and the tension ratio for the first belt 42 (about the double stacked pulley 40) will be referenced as $F_{T42}$, $F_{S42}$ and $R_{42}$, respectively. Thus, $$F_{T42}=F_6$$

$$F_{S42}=F_5$$

and, $$F_{T42}=F_{S42}*R_{42}$$

It should also be noted that, $$X_2=X_3=X$$

where distance X represents either distance $X_2$ or distance $X_3$. Now making these substitutions into the original equation it follows that, $$T_{53}=F_{S44}(X_1)-F_{S44}(X)+F_{S44}(X)+F_{T44}(X_4)-F_{S42}(X_5)-F_{T42}(X_6)-F_7(X_7)+F_8(X_8)$$

Now simplifying (the components $[-F_{S44}(X)+F_{S44}(X)]$ cancel out) and substituting further, $$T_{53}=F_{S44}(X_1)+F_{S44}R_{44}(X_4)-F_{S42}(X_5)-F_{S42}R_{42}(X_6)-F_7(X_7)+F_8(X_8)$$

Simplifying again, $$T_{53}=F_{S44}(X_1+R_{44}X_4)-F_{S42}(X_5+R_{42}X_6)-F_7(X_7)+F_8(X_8) \quad \text{Equation (1)}$$

With reference now to FIGS. 2–3, using Equation (1) the effect caused by adjusting the height of the mower deck 12 can be investigated. In other words, the change in the torque about the midsection 53 (hereinafter referred to as $\Delta T_{53}$) due to the height adjustment of the mower deck 12 can be derived using Equation (1). It should be noted that since the midsection 53 of the double pulley arm 50 is pivotably attached to the mower deck 12, as the mower deck 12 moves in forward direction 18 so does the midsection 53. Similarly, as the mower deck 12 moves in backward direction 19 so does the midsection 53. As noted above, the midsection 49 of the idler pulley arm 46 pivots about the pulley bolt 41.

Still referring to FIGS. 2–3, the impact of the motion of the mower deck 12 on Equation (1) will now be considered. The force $F_{S44}$ will not change significantly as the mower deck 12 is adjusted. The distance $X_1$ will decrease but the distance $X_4$ will increase as the mower deck 12 is lowered and therefore moved in forward direction 18. Conversely, the distance $X_1$ will increase but the distance $X_4$ will decrease as the mower deck 12 is raised and therefore moved in backward direction 19. Therefore, the net change in the distance $X_1+R_{44}X_4$ will be negligible regardless of the adjustment of the mower deck 12 position. In other words, the component of torque in Equation (1) due to the second belt 44 (shown as $F_{S44}$ $(X_1+R_{44}X_4)$) will not have any significant effect on the change in the torque about the midsection 53, $\Delta T_{53}$. Neither the force $F_{S42}$ nor the distance $X_5$ nor the distance $X_6$ will change significantly as the mower deck 12 is adjusted. Thus, the component of torque in Equation (1) due to the first belt 42 (shown as $F_{S42}$ $(X_5+R_{42}X_6)$) will not have any significant effect on the change in the torque about the midsection 53, $\Delta T_{53}$.

With continuing reference to FIGS. 2–3, the force $F_7$ will not change significantly as the mower deck 12 is adjusted, however, the distance $X_7$ will significantly change. As the mower deck 12 is lowered and therefore moved in forward direction 18, the distance $X_7$ will increase. Similarly, as the mower deck 12 is raised and therefore moved in backward direction 19, the distance $X_7$ will decrease. Thus, the component of torque in Equation (1) due to the second spring S2 (shown as $F_7$ $(X_7)$) will indeed have a significant effect on $\Delta T_{53}$. The distance $X_8$ will not change significantly as the mower deck 12 is adjusted, but the force $F_8$ will significantly change as the first spring S1 is lengthened (elongated) or shortened (compressed). As is commonly known in the art, increasing the length of a spring increases its force and decreasing the length of a spring decreases its force. Thus, the component of torque in Equation (1) due to the first spring S1 (shown as $F_8$ $(X_8)$) will also have a significant effect on $\Delta T_{53}$. It can thus be summarize that when the mower deck 12 is height adjusted the primary contributions to changes in the torque $\Delta T_{53}$ are from the first and second springs S1, S2. This can be expressed by the following equation that is derived from Equation (1) when noting that the components of torque due to the first and second belts 42, 44 will not have any significant effect on $\Delta T_{53}$.

$$\Delta T_{53}=F_8(X_8)-F_7(X_7) \quad \text{Equation (2)}$$

Still referring to FIGS. 2–3, what is especially beneficial about this invention is that the spring torque components due to the first and second springs S1, S2 oppose each other (i.e. balance each other) as the mower deck 12 is raised or lowered. This can be shown by considering Equation (2) for the case when the mower deck 12 is lowered, and therefore moved in forward direction 18. In this case, the force $F_7$ and the distance $X_8$ will not change significantly. However, the distance $X_7$ will increase significantly and the force $F_8$ will significantly increase since the first spring S1 will lengthened. Therefore, the component of torque due to the first spring S1 (shown as $F_8$ $(X_8)$) will increase $\Delta T_{53}$ and the component of torque due to the second spring S2 (shown as $F_7$ $(X_7)$) will decrease $\Delta T_{53}$. The net effect being that the components of torque due to the fist and second springs S1, S2 balance and thus $\Delta T_{53}$ does not significantly change. In other words, $\Delta T_{53}=0$. Using Equation (2) for the case when the mower deck 12 is raised, and therefore moved in backward direction 19 similarly shows that $\Delta T_{53}$ does not significantly change or, in other words, $\Delta T_{53}=0$. Thus, as the mower deck 12 is height adjusted the torques about the midsection 53 are balanced as are the tensions in the first and second belts 42, 44. It should now be appreciated that the belt tension mechanism 30 of this invention can be considered a belt tension balancing mechanism.

With reference now to FIGS. 1–2, the impact of the torques on the double pulley arm 50 and the idler pulley arm 46 will now be discussed. When the mower deck 12 is lowered and therefore moved in forward direction 18 the biasing force $F_8$ on the second end 52 of the double pulley arm 50 increases due to the increased length of the first spring S1. This creates increased torque about the midsection 53 in counterclockwise direction 55. However, opposing that counterclockwise torque is the torque on the second end 48 of the idler pulley arm 46. The biasing force $F_7$ remains constant but its distance $X_7$ from the midsection 53 of the double pulley arm 50 increases thereby increasing the contribution to the torque in a clockwise direction. Similarly, when the mower deck 12 is raised and therefore moved in backward direction 19, the biasing force $F_8$ on the second end 52 of the double pulley arm 50 decreases due to the decreased length of the first spring S1. This tends to decrease the counterclockwise torque about the midsection 53. However, the distance $X_7$ is also reduced thereby reducing the clockwise torque caused by the spring force $F_7$. Therefore, once again it is shown that the torques about the midsection 53 are balanced whether the mower deck 12 is being raised or lower.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof.

Having thus described the invention, it is now claimed:

1. A mower comprising:
   a frame;
   an engine mounted on said frame;
   a mower deck operatively connected to said frame, said mower deck being selectively position adjustable;
   a PTO pulley operatively connected to said engine;
   a double stacked pulley;
   a first belt for providing power from said PTO pulley to said double stacked pulley;
   a second belt for providing power from said double stacked pulley to said mower deck;
   an idler pulley for use in selectively tensioning said second belt;
   an idler pulley arm having first and second ends and a midsection, said midsection of said idler pulley arm being pivotably connected to said double stacked pulley, said idler pulley being rotatably connected to said first end of said idler pulley arm;
   a double stacked pulley arm having first and second ends and a midsection, said midsection being pivotably connected to said mower deck, said double stacked pulley being pivotably connected to said first end of said double pulley arm;
   first biasing means for biasing said double stacked pulley and tensioning said first belt, said first biasing means having first and second ends, said second end of said first biasing means being pivotably connected to said second end of said double pulley arm;
   second biasing means for biasing said idler pulley and tensioning said second belt, said second biasing means having first and second ends, said second end of said second biasing means being pivotably connected to said second end of said idler pulley arm;
   a pivot bracket, said pivot bracket being pivotably connected to said frame, said first ends of said first and second biasing means being pivotably connected to said pivot bracket; and,
   a tension arm for selectively pivoting said pivot bracket, said tension arm being rigidly attached to said pivot bracket, said tension arm selectively simultaneously tensioning said first and second belts from an inoperative condition to an operative condition, said tension arm selectively simultaneously pivoting said idler pulley arm and said double pulley arm in opposite directions.

2. The mower of claim 1 further comprising:
   balancing means for balancing tension on said first and second belts as said mower deck is selectively position adjusted, said balancing means balancing torque about said midsection of said double pulley arm, said double pulley arm pivoting about said double stacked pulley as the mower deck is selectively position adjusted.

3. The mower of claim 1 wherein said double stacked pulley is positioned between said PTO pulley and said mower deck.

4. The mower of claim 1 wherein said double stacked pulley is positioned between said engine and said mower deck.

5. The mower of claim 1 wherein said idler pulley arm is V-shaped at an angle B within the range of 90° to 170° and said double pulley arm is V-shaped at an angle A within the range of 90° to 170°.

6. The mower of claim 1 wherein said mower is a riding mower.

7. A method of tensioning a belt drive system on a mower, the method comprising the steps of:
   providing a mower that includes a frame, an engine mounted on said frame, a mower deck operatively connected to said frame and having at least a first spindle pulley, a PTO pulley operatively connected to said engine, a double stacked pulley, a first belt for providing power from said PTO pulley to said double stacked pulley, and a second belt for providing power from said double stacked pulley to said at least a first spindle pulley;
   providing said mower with a belt tension mechanism that includes a tension arm, a double pulley arm operatively connected to said double stacked pulley, and an idler pulley arm operatively connected to an idler pulley that is operatively associated with said second belt;
   moving said tension arm;
   pivoting said double pulley arm in a first direction;
   pivoting said idler pulley arm in a second direction; and,
   tensioning said first and second belts from an inoperative condition to an operative condition.

8. The method of claim 7 further comprising the steps of:
   wherein before the step of pivoting said double pulley arm in a first direction, the method comprises the step of biasing said double pulley arm with a first spring; and,
   wherein before the step of pivoting said idler pulley arm in a second direction, the method comprises the step of biasing said idler pulley with a second spring.

9. A method of balancing belt tensions in a belt drive system on a mower, the method comprising the steps of:
   providing a mower that includes a frame, an engine mounted on said frame, a mower deck operatively connected to said frame and having at least a first spindle pulley, a PTO pulley operatively connected to said engine, a double stacked pulley, a first belt for providing power from said PTO pulley to said double stacked pulley, and a second belt for providing power from said double stacked pulley to said at least a first spindle pulley;
   proving said mower with a belt tension balancing mechanism that includes a double pulley arm having first and second ends and a midsection pivotably connected to said double stacked pulley;
   adjusting the position of said mower deck; and,
   balancing torque about said midsection of said double pulley arm.

10. The method of claim 9 wherein after the step of moving said mower deck, the method comprises the steps of:
  pivoting said first end of said double pulley arm about said double stacked pulley; and,
  increasing a biasing force on said second end of said double pulley arm.

11. A device comprising:
a frame;
an engine mounted to said frame;
a first implement operatively connected to said frame, said first implement having an implement pulley;
a belt drive system including,
  A) a double stacked pulley having a pulley bolt;
  B) a first belt for providing power from said engine to said double stacked pulley; and,
  C) a second belt for providing power from said double stacked pulley to said implement pulley, and;
a belt tension mechanism including,
  A) first tensioning means for tensioning said first belt, said first tensioning means comprising a first spring and an angled double pulley arm, said double pulley arm pivotably connected to said first implement, said double pulley arm being attached to said pulley bolt;
  B) second tensioning means for tensioning said second belt, said second tensioning means comprising an idler pulley, an angled idler pulley arm and a second spring, said idler pulley being rotatably connected to said idler pulley arm, said idler pulley arm being attached to said pulley bolt; and,
  C) a tension arm, said first spring being pivotably connected to said double pulley arm and to said tension arm, said second spring being pivotably connected to said idler pulley arm and to said tension arm, said tension arm selectively simultaneously tensioning said first and second belts from an inoperative condition to an operative condition.

12. The device of claim 1 wherein said first implement is selectively position adjustable, the device further comprising:
  balancing means for balancing tension in said first and second belts as said first implement is position adjusted with respect to said frame.

* * * * *